(12) United States Patent
Adam

(10) Patent No.: US 11,679,938 B2
(45) Date of Patent: Jun. 20, 2023

(54) DEVICE FOR CONVEYING PRODUCTS, HAVING A WEAR INDICATOR

(71) Applicant: SIDEL CANADA INC., Laval (FR)

(72) Inventor: Alex Adam, Laval (CA)

(73) Assignee: SIDEL CANADA INC., Laval (CA)

( * ) Notice: Subject to any disclaimer, the term of this patent is extended or adjusted under 35 U.S.C. 154(b) by 0 days.

(21) Appl. No.: 17/416,470

(22) PCT Filed: Dec. 20, 2019

(86) PCT No.: PCT/IB2019/061200
§ 371 (c)(1),
(2) Date: Jun. 19, 2021

(87) PCT Pub. No.: WO2020/129011
PCT Pub. Date: Jun. 25, 2020

(65) Prior Publication Data
US 2022/0063919 A1 Mar. 3, 2022

(30) Foreign Application Priority Data
Dec. 21, 2018 (FR) ........................................ 1873931

(51) Int. Cl.
*B65G 15/62* (2006.01)
*B65G 21/22* (2006.01)

(52) U.S. Cl.
CPC .......... *B65G 15/62* (2013.01); *B65G 2207/48* (2013.01)

(58) Field of Classification Search
None
See application file for complete search history.

(56) References Cited

U.S. PATENT DOCUMENTS

| 4,556,143 | A  | * | 12/1985 | Johnson | ................ | B65G 17/40 |
|           |    |   |         |         |                  | 198/860.1  |
| 6,612,423 | B1 | * | 9/2003  | Silverman | .............. | B65G 13/07 |
|           |    |   |         |         |                  | 198/781.03 |
| 7,753,194 | B1 | * | 7/2010  | Jager   | ...................... | B65G 15/62 |
|           |    |   |         |         |                  | 198/860.1  |

(Continued)

FOREIGN PATENT DOCUMENTS

| EP | 0142716 | A2 | 5/1985 |
| EP | 0151227 | A1 | 8/1985 |

(Continued)

OTHER PUBLICATIONS

International Search Report dated Apr. 9, 2020 for PCT/IB2019/061200.
Preliminary Search Report dated Sep. 6, 2019 for FR1873931.

*Primary Examiner* — Kavel Singh

(57) ABSTRACT

The present invention concerns a device for conveying products, which is intended for a production and processing line for these products and comprises at least one movable element in the form of a conveyor belt or link chain and a fixed support for the movable element, the support being in the form of at least one slider, the slider supporting the movable element in contact with at least one wear surface located on said slider, characterized in that at least one slider has, under the wear surface, at least one underlying layer, the underlying layer consisting of a material with a different appearance to the appearance of the material of the wear surface. The invention further relates to a slider for such a conveying device.

20 Claims, 2 Drawing Sheets

(56) References Cited

U.S. PATENT DOCUMENTS

Figure 1:
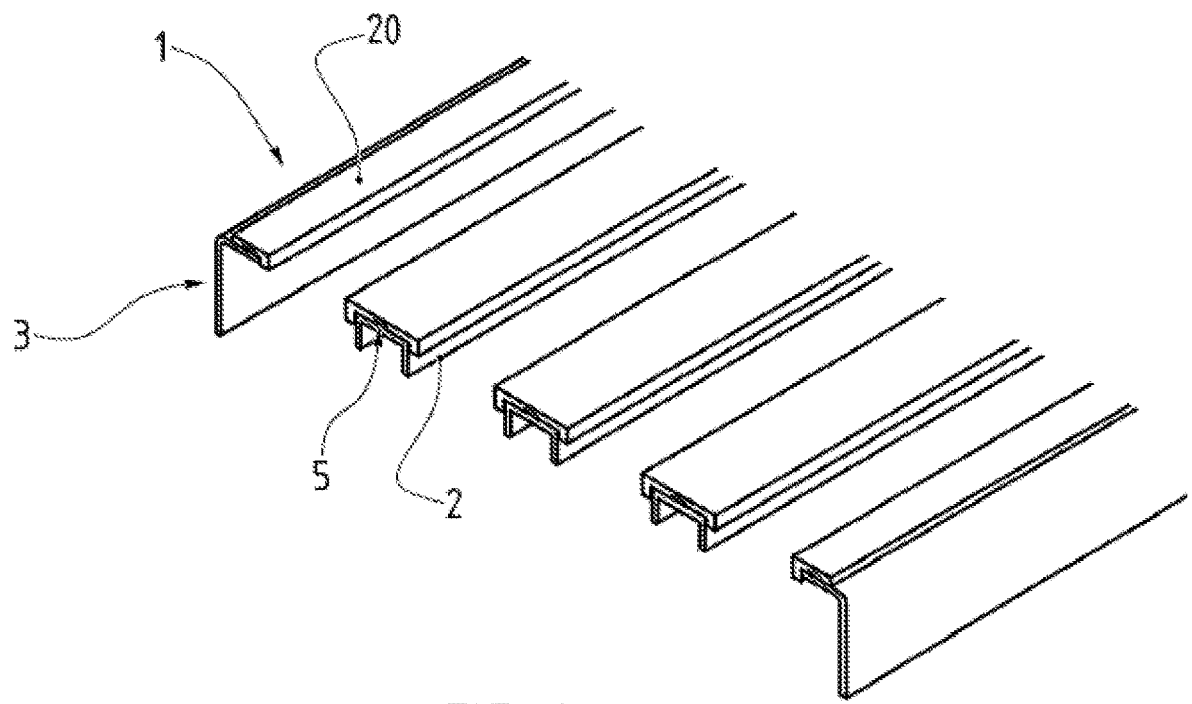

| | | | | |
|---|---|---|---|---|
| 9,102,476 B2* | 8/2015 | Musick | ................... | B65G 21/22 |
| 9,409,721 B2* | 8/2016 | Musick | ................ | B65G 17/086 |
| 10,793,363 B2* | 10/2020 | Chung | ............... | B65G 21/2081 |

FOREIGN PATENT DOCUMENTS

| | | | |
|---|---|---|---|
| EP | 1066991 | A2 | 1/2001 |
| EP | 1870260 | A1 | 12/2007 |
| FR | 2735113 | A1 | 12/1996 |
| JP | 2005289610 | A | 10/2005 |
| KR | 20110062733 | A | 6/2011 |
| KR | 101720560 | B1 | 3/2017 |
| WO | 9321090 | A1 | 10/1993 |
| WO | 9641759 | A1 | 12/1996 |
| WO | 2019093643 | A1 | 5/2019 |
| WO | 2012030609 | A2 | 3/2020 |

* cited by examiner

DEVICE FOR CONVEYING PRODUCTS, HAVING A WEAR INDICATOR

The present invention falls within the field of the conveying of products within a line for producing and processing said products.

Such products can be, in a nonlimiting manner, containers, such as bottles, cans, cardboard-covered brick packs, or even such containers individually or grouped together in boxes, crates, cardboard or bundles. Such products can also be preforms or stoppers.

As is known, in an industrial line, the products can receive several different successive processing operations, ranging from the production of the container by a plastic injection-blow molding or stretch blow-molding operation to the packaging in batches or several products grouped together, notably via filling, closure by a stopper and the labeling of the products individually.

The invention relates to the conveying of products, preferably individually, for their processing operations. Such conveying of products is performed between the processing stations and within a station.

Currently, the products are transported by a conveying device provided with at least one movable element ensuring at least a part of the displacement of the products in at least one longitudinal direction. Such a conveying device extends longitudinally, transporting the products from one end to another, preferentially linearly.

A conveyor device that is widely used is of endless belt type and comprises at least one movable element in the form of a mat or of a chain with links, being wound at each end around rollers. This mat receives the products on the top face, directly supporting their bottom, or else indirectly, notably via a bucket, a shuttle or bin.

Another movable element of a conveying device can be a lateral guide, often disposed along an edge of the device. Such a lateral guide can take the form of a rail, extending substantially vertically along the direction of circulation and disposed to laterally guide the products along the device.

Other types of movable elements are known.

In one case as in the other, each movable element is displaced with respect to the structure of the device, in particular with respect to a fixed support. Such a support generally takes the form of at least one runner. One or more movable elements circulate in contact with one or more runners. In short, one or more runners support one or more movable elements, over all or part of the length of the conveying device.

Each runner has different technical functions, depending essentially on the movable element that it supports, more particularly in the case of a flexible or articulated movable element, notably of link chain type. As a nonlimiting example, a runner can ensure that a movable element is transversely held, and/or confer a required rigidity of flatness, above all when the movable element is loaded with products. Such a runner can also support an outgoing strand but also a return strand of a mat or of a chain, notably on the bottom face of the conveyor.

According to a known example of conveying device, of endless belt type, a mat or a link chain bears on a support which can comprise several runners extending parallel over the entire length of said device, between the rollers around which said mat is wound. The latter therefore sees the bottom face of its top strand resting against the top face of each runner.

Consequently, a runner has a fixed face which is in contact with or bearing on a surface of a movable element, which provokes wear over time, essentially because of the frictions generated between the materials. For reasons of costs that are inherent to maintenance, it is preferable to replace a runner rather than a movable element and, because of that, the material chosen for a runner is less strong, and softer, than the material forming said movable element. Thus, the wear provokes more deterioration of the face of a runner rather than of the material of a movable element.

A runner therefore has, in the top part or at the edge situated toward the movable element, at least one "wear surface", in contact with at least a part of at least one movable element.

Such wear is manifested over time irregularly and unequally, depending on where the points or the surfaces of contact with each movable element are situated, dependent on its displacements and on the loads that it transports. This wear can be accentuated by external elements originating from the environment, such as, for example, dust or hard particles, as is the case in the conveying of products made of glass or of metal, that are notably dirty.

Depending on the use made of the conveying device, such wear can become prejudicial to its optimal operation, such that it is necessary to regularly check the state of the wear surface of the support, namely of each runner. The tedious aspect of such inspection, to be applied over the entire length of each runner of the conveying device, is easy to understand. In addition, such inspection cannot always be performed directly and visually, because of fouling and clogging: this operation is then performed by operators, checking for any thickness differences, through measurements performed manually. This operation causes time to be lost.

The aim of the invention is to at least partly overcome the drawbacks of the state of the art by proposing a device for conveying products in a line for producing and processing said products, the construction of which allows the state of wear of each fixed support in contact with at least the movable element to be rapidly and easily checked.

For this, an internal material of a fixed support comprises at least one underlying layer, initially hidden behind its wear layer, said underlying layer having a visually distinct appearance, being differentiated manifestly and unequivocally from the material forming said wear layer. In particular, it is possible to choose an appearance, notably a color, that is clearly distinct for the or each underlying layer, creating an indicator with a contrast allowing the state of wear of the wear surface of each runner of a support element to be determined.

Thus, according to the invention, the conveying device comprises at least one movable element in the form of a mat or a link chain of a conveyor and a fixed support for said movable element, said support being in the form of at least one runner, said runner supporting said movable element in contact with at least one wear surface that it has.

Such a device is characterized in that, at least:
- at least one runner comprises, under said wear surface, at least one underlying layer;
- said underlying layer being composed of a material with an appearance different from the appearance of the material of said wear surface.

According to additional and nonlimiting features, such a conveying device can comprise at least two underlying layers (50, 51) disposed with different thicknesses within said runner, superposed vertically with respect to one another.

Said two underlying layers can be offset transversely.

A first underlying layer can be at least partially embedded in the thickness of a second underlying layer.

A first underlying layer can comprise a material with a color distinct from the material of a second underlying layer.

Said material of each underlying layer can comprise a color defined to contrast with the color of said wear surface.

At least one underlying layer can have a thickness less than the thickness of said runner under its wear surface, said underlying layer lying on the rest of said material of said runner.

Each underlying layer can extend over at least a part over the length of said runner, preferably over the entire length of said runner.

Each underlying layer can extend over at least a part of the width of said runner, preferably over a part less than the width of said runner.

The invention relates also to such a runner alone for a conveying device, notably as a wear piece that should be replaced.

Thus, the wear of the normal material of the runner makes it possible to reveal a specific material after or during wear.

Figure 2:
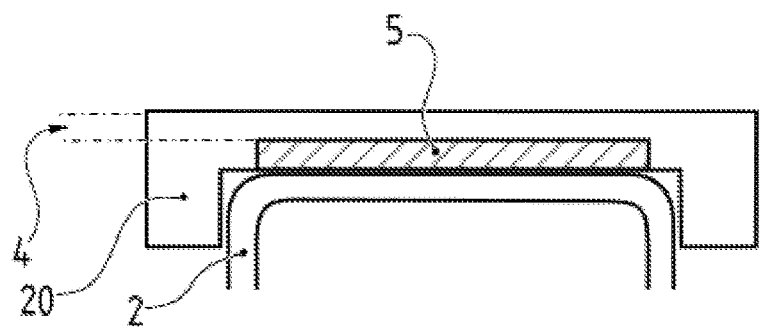
Figure 3:
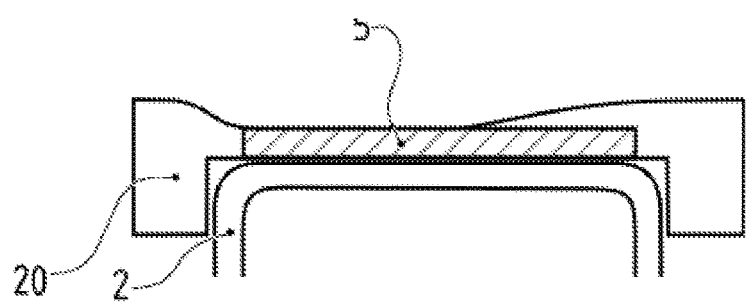
Figure 4:
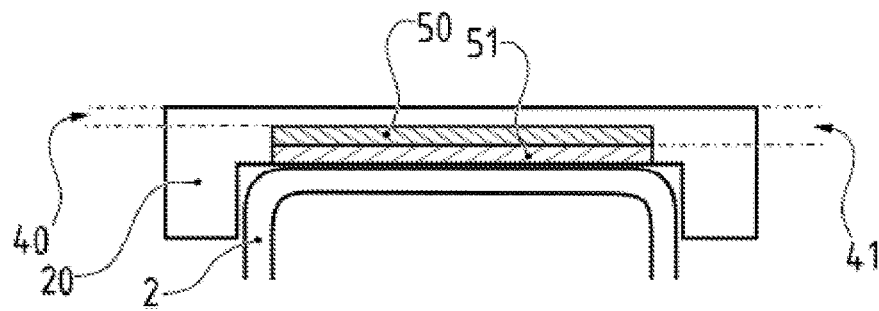
Figure 5:
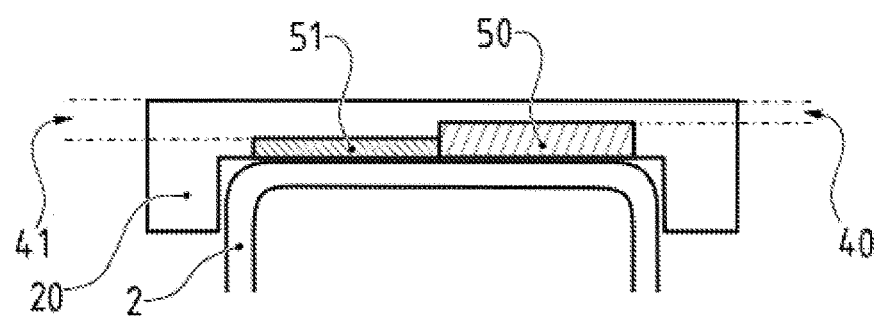
Figure 6:
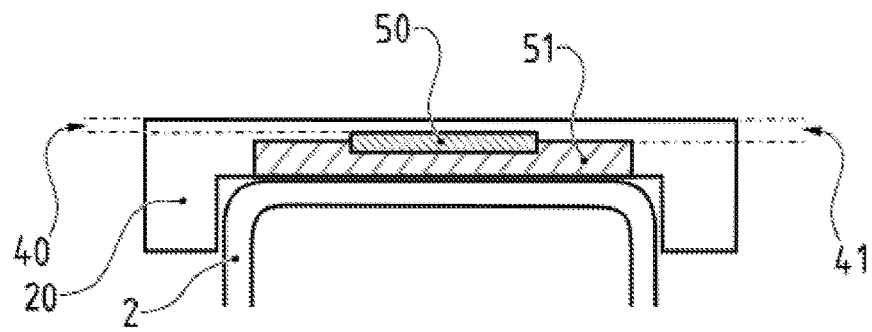

Other features and advantages of the invention will emerge from the following detailed description of the non-limiting embodiments of the invention, with reference to the attached figures, in which:

FIG. 1 schematically represents an isometric partial view, showing a transverse cross section of several runners of an embodiment of a conveying device;

FIG. 2 schematically represents a simplified view on a vertical transverse cross section of FIG. 1, according to an embodiment of a device, showing a runner with a single underlying layer, in a configuration of unpronounced degradation of the wear surface;

FIG. 3 schematically represents a view similar to FIG. 2, in a configuration of advanced degradation of a part of the wear surface, revealing said single underlying layer;

FIG. 4 schematically represents a cross-sectional view of an embodiment, showing a runner provided with two underlying layers, superposed;

FIG. 5 schematically represents a cross-sectional view of an embodiment, showing a runner provided with two underlying layers, juxtaposed transversely with different thicknesses; and FIG. 6 schematically represents a cross-sectional view of an embodiment, showing a runner provided with two underlying layers, according to a specific configuration of partial inclusion of one with respect to the other.

The present invention relates to the conveying of products in a line for producing and processing said products.

Such a product is a container, such as a flask, rigid or semi-rigid. Such a container is intended to contain, in a non-exhaustive manner, a fluid, a liquid, powders or granules, notably of agri-food or cosmetic type. A product can also be a preform or a stopper. A product can be individual or grouped, in the form of a batch, bundle, in a crate or cardboard box.

In an industrial line, the products can receive several different successive processing operations, ranging from production of the container by a plastic injection-molding or stretch blow-molding operation to the packaging in batches of several products grouped together, notably via the bottling, the closure by a stopper and the labeling of the products individually. To convey the products along the production line, within the processing stations and between the latter, they have to be displaced in succession. For this, the subject of the invention is a device 1 for conveying products for a line for producing and processing said products.

Such a device 1 can be designated "conveyor". It comprises at least one movable element (not represented) and a fixed support 2 for the at least one movable element. The movable element can comprise a conveying surface, such as a mat or a link chain, on which the products rest, generally on their bottom. The movable element can comprise a bearing surface against which a lateral wall of said products comes into contact: the conveyor is then used to laterally guide the products. A movable element can also be a chain that is would partially around a wheel or a roller.

The movable element can comprise one or more surfaces, several surfaces being able to be displaced synchronously or out of phase with one another. Such a movable element can comprise, disposed one after the other over its width, several link chains driven at different speeds.

According to one embodiment, the device 1 is of endless belt type and the movable element comprises a wound belt.

The movable element is driven by suitable motorization means. In the case of an endless belt conveyor, the movable element is driven around rollers, notably via chains or belts.

The fixed support serves as a structure and can be mounted secured to the frame 3 of the device 1.

A fixed support 2 can take the form of at least one runner 20. Preferably, one and the same fixed support comprises several runners 20.

Preferentially, said runners 20 can extend longitudinally, with respect to the direction of displacement of the movable element of the device 1. Otherwise, said runners 20 can extend transversely or angularly inclined, with respect to the direction of displacement of the movable element of the device 1.

The runners 20 can extend in a plane parallel to the plane containing the movable element.

The runners 20 can be situated overall in a horizontal or substantially horizontal plane, or else be inclined upward or downward along the longitudinal direction of circulation of the conveyor.

The runners 20 can be straight or curved, following the trajectory of the movable element and of the conveyor.

A runner 20 supports said movable element. Preferentially, several runners support the movable element in several zones.

Indeed, several runners 20 can extend parallel or substantially parallel to one another, spaced apart transversely to the conveying direction according to regular or irregular intervals. Thus, the runners 20 move against the surface opposite the conveying surface, conferring support in order to offer sufficient resistance of the movable element for the conveying of the products, but also, notably, to guide said movable element in order for its displacement to take place aligned if possible in the conveying direction, namely longitudinally.

The example that can be seen in FIG. 1 shows five runners 20, securely mounted covering five rails with which the frame 3 is provided. Said runners 20 are parallel and regularly spaced apart. The movable element then comes to bear on top, its bottom face resting in dedicated zones against the top faces of the runners 20.

Further, a runner 20 supports the movable element in contact with at least one wear surface 4.

In fact, in order to avoid wear of the movable element and/or of the elements of the frame 3, provision is made to confer on the runners 20 a material susceptible to wear, thus protecting the material of the movable element and/or of the elements of the frame 3. In particular, the so-called "wear"

surface 4 in contact with the movable element degrades and wears down over time and from the friction provoked by the contact of the movable element.

Furthermore, said wear surface 4 can be a distinct layer, made of a different material, or else a portion of the material forming the rest of a runner 20.

A runner 20 can be composed of a plastic material, notably of polyethylene (PE) type, for example of ultra-high density polyethylene (UHMW-PE).

A wear surface 4 can be composed of similar materials, notably if it forms an integral part of the rest of the runner 20.

Advantageously, the invention envisages allowing the integrity of the runners 20 of a conveying device 1 to be rapidly and easily inspected. For this, a runner 20 comprises, under said wear surface 4, at least one underlying layer 5. In some cases, just one of the runners 20 of the device 1 comprises, under said wear surface 4, at least one underlying layer 5, but preferentially several runners 20 comprise, under each of their wear surfaces 4, at least one underlying layer 5.

"Underlying" is understood to mean that the layer 5 is hidden at least partly by the wear surface, in a new state and possibly also in a relatively non-worn down state of a runner 20.

An underlying layer 5 extends in the three dimensions of space, having a volume determined by a length extending preferentially longitudinally and a width extending preferentially transversely with respect to the greatest length of the corresponding runner, and a thickness.

In the exemplary embodiment, the underlying layer 5 is situated under the wear surface. In a vertical direction, the wear surface 4 is then situated above and the underlying layer 5 below.

According to one configuration, the underlying layer 5 is on the side opposite the surface of the movable element against which the products come to bear. In other words, the underlying layer 5 is behind the wear surface 4, with respect to the movable element.

Furthermore, an underlying layer 5 is preferably included or incorporated in the material of a runner 20. In other words, the underlying layer 5 can be surrounded by the material of the runner 20, covered by the wear surface 4, but also at its edges by other parts of the material forming said runner 20. On the bottom face of the runner 20, the underlying layer 5 can be visible or not, then being fully captive inside said runner 20.

Furthermore, said underlying layer 5 is composed of a material that is visually distinct from said wear surface 4, preferably for an operator without an optical instrument. Such material has a distinct appearance which can have visual characteristics very different from those of the wear surface 4, by virtue of its texture or its pattern, but also its coloring.

Preferentially, said material of each underlying layer 5 can comprise a color defined with a high contrast, notably an opposing contrast, to the color of said wear surface 4. In other words, the color or colors of the underlying layer 5 are clearly and unequivocally distinguished. Such a distinction can be made by the naked eye, directly by an operator. As an example, a wear surface 4 can be green or blue, whereas the material of an underlying layer 5 can be yellow, orange or red. If a wear surface 4 is black or white, then the underlying layer 4 can respectively be white or black.

Furthermore, the colors between the wear surface 4 and the underlying layer 5 can be complementary.

According to one embodiment, the material forming the underlying layer 5 can be colored in a degraded way. The coloring of the underlying layer 5 can be close on the surface to the color of the wear surface 4, then be differentiated commensurate with its depth, notably changing hue to a color that is brighter, more pigmented, more visually striking: being differentiated increasingly from the initial color, and from the color of said wear surface 4. In short, the contrast between the wear surface 4 and the underlying layer 5 increases commensurate with the degradation, becoming extremely strong as said underlying layer 5 erodes.

According to a specific embodiment, the colors of the underlying layer 5 are distinguished through the use of complementary vision equipment, notably of ultraviolet or infrared radiation type, or else of cold light or black light type. This particular feature notably makes it possible to automate the inspection of the wear surface 4, via a corresponding sensor or detector, allowing the state of wear to be checked without moving the movable element, as long as openings are provided for this purpose or else the material of said movable element allows the radiation provided for the inspection of the underlying layer 5 to pass.

According to one embodiment, each underlying layer 5 extends over a part of the depth of said runner 20. Naturally, the underlying layer 5 extends under the wear surface 4, but it can also extend, under the wear surface 4 over the entire thickness or a part of the thickness of the runner 20, even of one of its components or constituents.

According to the embodiments that can be seen in FIGS. 2 to 6, the underlying layer or layers 5 extend under the wear surface 4, bracketed by vertical segments of a runner 20, for example shaped in an inverted U form. Thus, each underlying layer 5 is covered by the wear surface 4 and surrounded by the branches of such a runner 20. Each underlying layer 5 then has, under the wear surface 4, a thickness equivalent to the rest of the material forming the runner 20 at this level.

According to another configuration, an underlying layer 5 can be totally included in the material of the runner 20, also enclosed underneath, resting on the said material of said runner 20. An underlying layer 5 is then entirely bracketed or enclosed, sandwiched inside its runner 20.

It will be noted that the material forming the rest of the runner 20, namely its wear surface 4 and its lateral branches, can constitute a single monolithic block, to which the underlying layer or layers 5 is or are added by inclusion.

Furthermore, the inclusion of the underlying layers 5 can be done in continuity of material, with no space or void, by bonding, thermobonding, material diffusion, or even interleaved by force, possibly with a plastic deformation.

Several underlying layers 5 can be abutted longitudinally and/or transversely.

According to one embodiment, each underlying layer 5 extends over only a part of the width of said runner 20. In other words, transversely, each underlying layer 5 is disposed at a specific location, notably at the center of the material forming the rest of the runner 20, still under the wear surface 4. An underlying layer 5 is then surrounded transversely on both sides by the material forming the runner 20.

According to one embodiment, each underlying layer 5 extends over at least a part of the length of said runner 20. One and the same underlying layer 5 can extend along one or more separate segments, at regular or irregular intervals longitudinally. An underlying layer 5 can therefore have several segments which makes it overall continuous or discontinuous longitudinally. The location and the length of each segment of an underlying layer 5 can be determined as a function of the conveyor, in particular as a function of the zones of bearing and of wear by the movable element. Preferably, an underlying layer 5 extends over the entire length of said runner 20.

According to a combined configuration, an underlying layer 5 can be limited in length with respect to the length of the runner 20, forming segments, notably in which the dimension extending transversally is greater than the dimension extending longitudinally, each underlying layer 5 forming a transverse tell-tale indicator at a point of the runner 20.

According to one embodiment, as can be seen in FIGS. 2 and 3, a runner 20 comprises a single underlying layer 5. This underlying layer 5 extends only over a part of the width of the runner 20, notably centered in a transverse direction.

According to one embodiment, each underlying layer 5 can have a parallelepipedal section, notably rectangular, as can be seen in FIGS. 2 to 5. Furthermore, the lateral edges extend vertically or substantially vertically.

According to another embodiment, the or each underlying layer 5 can have a pyramidal or trapezoidal section, notably widening from the wear surface 4. According to another embodiment, each underlying layer 5 can have a section with edges oriented in a divergent manner from the wear surface 4. Thus, the gradual wear of the underlying layer 5 widens as its top surface becomes visible over time.

According to another embodiment, each underlying layer 5 can have a section with straight or even rounded edges, notably convex or concave with respect to the interior of said underlying layer 5.

The underlying layer 5 can have any thickness, preferably a thickness approximately equivalent to the thickness of the material forming the wear surface 4.

As can be seen in particular in FIG. 3, the local or partial deterioration, over a part of the thickness of the material of the wear surface 4 causes the underlying layer 5 to be bared, that is to say rendered visible.

According to another embodiment, the device 1 comprises several underlying layers 50, 51. Such underlying layers 50, 51 can have different configurations, namely they can have different lateral or longitudinal distributions, different thicknesses, or even different depths with respect to one another. In other words, in the case of at least two underlying layers 50, 51, the erosion of a first depth 40 of the wear surface 4 will first of all bare a first underlying layer 5, leaving a second underlying layer 51 at a second depth 41 from the wear surface 4 hidden, until the wear reaches said second underlying layer 51 and bares it. Furthermore, the different underlying layers 50, 51 need not be monolithic namely composed of one and the same material, but can be distinct components, possibly with different materials.

The invention thus makes it possible to obtain gradual degrees of wear and to be able to easily observe them. In short, the wear to the first underlying layer 50 makes it possible to calculate the time needed to wear down the rest of the wear surface 4 or of said first underlying layer 50 to said second underlying layer 51. Indeed, in the case of similar materials, the degradation time observed with respect to the state of the wear surface 4 and/or of each underlying layer 5, 50, 51 is equivalent and makes it possible to make an extrapolated temporal approximation of the remainder of the life of the runner 20 before its replacement. Consequently, it is possible to schedule maintenance in the meantime, even order the parts and receive them, thus limiting the bulk of spare parts stocks.

As an example, a first underlying layer 50 can have a yellow or orange color, whereas the second underlying layer 51 has a red or similar color, allowing direct observation of the state of wear of the runner 20.

According to another embodiment, the device 1 comprises at least two underlying layers 50, 51 disposed at different thicknesses or depths of said runner 20. As can be seen in the example of FIGS. 4 and 6, the underlying layers 50, 51 are superposed. In other words, the second underlying layer 51 is under or behind the first underlying layer 50. According to the example of FIG. 4, the two underlying layers 50, 51 have the same width.

According to another embodiment, in superposed cases, a first underlying layer 50 is at least partially embedded in the thickness of a second underlying layer 51. In short, the second underlying layer 51 receives, in its thickness, a part of the thickness of the first underlying layer 50, the latter extending above and not being flush with said second underlying layer 51. Indeed, it is essential for the first underlying layer 50 to be visible before the second underlying layer 51 and the first underlying layer 50 must therefore internally extend beyond the second underlying layer 51, while remaining in the material of the runner 20, in particular behind and included in the wear surface 4.

According to one embodiment, the device 1 comprises two underlying layers 50, 51 that are offset with respect to one another. This offset is understood to be transversal, as FIG. 4 partially shows. The underlying layers 50, 51 can have different thicknesses, as can be seen in FIG. 4, or even have the same thickness: one of the underlying layers 50 (or 51) can then be depressed more into the material of the runner 20, compared to the other underlying layer 51 (or 50).

As explained previously, according to one embodiment, a first underlying layer 50 comprises a material of a color distinct from the material of a second underlying layer 51. Thus, it is possible to differentiate them visually with respect to one another, but also with respect to the color of the material of the runner 20.

In a related way, one or each of the underlying layers 5, 50, 51 can be produced at the time of production of the runner 20, for example by injection molding, by extrusion or rolling, inclusion by bonding or thermobonding, or even mechanically with or without plastic deformation. In short, the material of the underlying layers 5, 50, 51 is directly incorporated during the production of the material of the runner 20.

According to another possibility, the underlying layers 5, 50, 51 can be incorporated after the production of the rest of the runner 20, notably in recesses or grooves shaped and dimensioned to be complementary, which make it possible to receive and fix therein said underlying layers 5, 50, 51. Such an addition can be performed mechanically or else by the addition of the material forming said underlying layers 5, 50, 51, for example by an additional injection or pouring step. A suitable fixing of the materials of the underlying layers 5, 50, 51 with the material of the runner 20 can be envisaged, notably by bonding or thermobonding.

As emerges from the above, according to one embodiment, the device 1 comprises at least two underlying layers 50, 51 disposed at different thicknesses within the runner 20. In other words, the different underlying layers 50, 51 are disposed at different distances from the wear surface 4. FIGS. 4 to 6 illustrate examples corresponding to this embodiment.

As the runner wears, the first underlying layer 50, which is the closest to the wear surface 4, can then be seen to appear, followed by the second, 51, that is further away.

Preferentially, each underlying layer 50, 51 has an appearance that is different not only from the appearance of the material of the wear surface, but also different from the appearance of the material of the other underlying layer or layers.

Thus, the underlying layers 50, 51 can be visually distinguished from one another.

When the device 1 comprises at least two underlying layers 50, 51, it is possible to more precisely identify the degree of wear of the runner 20 and predict its replacement.

For example, once the first underlying layer 50 is visible it is known that the wear of the runner is becoming significant and that it will be soon necessary to replace it.

Once the second underlying layer 51 is visible, it can be deduced therefrom that the wear is more advanced and that now is the time to change the runner 20 to install a new one.

It will easily be understood that, the more underlying layers there are, the more precise will be the wear information obtained.

As represented in FIG. 4, the device 1 can comprise at least two underlying layers 50, 51 that are superposed vertically. The different layers 5 can then be stacked one on top of the other.

As represented in FIG. 5, the underlying layers 50, 51 can also be offset transversely. The layers 50, 51 can then be in contact with one another or spaced apart transversely. They can have the same thickness or not. They can for example be present at distinct and separate depths so that, depending on the wear of the runner, only a single underlying layer 5 can be seen at a time. They can also, as represented in FIG. 5, be commonly present from a certain depth. In this way, when the runner wears, a first underlying layer 50 is first seen, followed by two layers 50, 51 simultaneously, and possibly more, depending on the number of underlying layers possibly present.

As represented in FIG. 6, a first underlying layer 50 can be at least partially incorporated into the thickness of a second underlying layer 51.

Thus, the conveying device 1 according to the invention, with its runner or runners 20 provided with underlying layers 5, 50, 51, with a material which can be visually distinguished, allows the state of wear to be rapidly and simply inspected.

The invention claimed is:

1. A device (1) for conveying products for a line for producing and processing said products, comprising:
   at least one movable element in the form of a mat or chain with links of a conveyor and a fixed support (2) for said movable element, said support being in the form of at least one runner (20), said runner (20) supporting said movable element in contact with at least one wear surface (4), wherein:
   at least one runner (20) comprises, under said wear surface (4), at least one underlying layer (5) parallel to the wear surface (4);
   said wear surface (4) is superimposed on top of the underlying layer (5); and
   said underlying layer (5) is composed of a material with an appearance that differs from the appearance of the material of said wear surface (4).

2. The conveying device (1) as claimed in claim 1, further comprising at least two underlying layers (50, 51) disposed with different thicknesses within said runner (20), superposed vertically with respect to one another.

3. The conveying device (1) as claimed in claim 2, wherein said underlying layers (50, 51) are offset transversely.

4. The conveying device (1) as claimed in claim 2, wherein a first underlying layer (50) is at least partially embedded in the thickness of a second underlying layer (51).

5. The conveying device (1) as claimed in claim 2, wherein a first underlying layer (50) comprises a material of a color distinct from the material of a second underlying layer (51).

6. The conveying device (1) as claimed in claim 1, wherein said material of each underlying layer (5, 50, 51) comprises a color defined so as to contrast with the color of said wear surface (4).

7. The conveying device (1) as claimed in claim 1, wherein at least one underlying layer (5, 50, 51) has a thickness less than the thickness of said runner (20) under its wear surface (4), said underlying layer (5) lying on the rest of said material of said runner (20).

8. The conveying device (1) as claimed in claim 1, wherein each underlying layer (5, 50, 51) extends over at least a part over the length of said runner (20), preferably over the entire length of said runner.

9. The conveying device (1) as claimed in claim 1, wherein each underlying layer (5, 50, 51) extends over at least a part of the width of said runner (20), preferably over a part less than the width of said runner (20).

10. A runner (20) for a conveying device (1) as claimed in claim 1.

11. The conveying device (1) as claimed in claim 3, wherein a first underlying layer (50) is at least partially embedded in the thickness of a second underlying layer (51).

12. The conveying device (1) as claimed in claim 3, wherein a first underlying layer (50) comprises a material of a color distinct from the material of a second underlying layer (51).

13. The conveying device (1) as claimed in claim 4, wherein a first underlying layer (50) comprises a material of a color distinct from the material of a second underlying layer (51).

14. The conveying device (1) as claimed in claim 2, wherein said material of each underlying layer (5, 50, 51) comprises a color defined so as to contrast with the color of said wear surface (4).

15. The conveying device (1) as claimed in claim 3, wherein said material of each underlying layer (5, 50, 51) comprises a color defined so as to contrast with the color of said wear surface (4).

16. The conveying device (1) as claimed claim 2, wherein at least one underlying layer (5, 50, 51) has a thickness less than the thickness of said runner (20) under its wear surface (4), said underlying layer (5) lying on the rest of said material of said runner (20).

17. The conveying device (1) as claimed claim 3, wherein at least one underlying layer (5, 50, 51) has a thickness less than the thickness of said runner (20) under its wear surface (4), said underlying layer (5) lying on the rest of said material of said runner (20).

18. The conveying device (1) as claimed in claim 2, wherein each underlying layer (5, 50, 51) extends over at least a part over the length of said runner (20), preferably over the entire length of said runner.

19. The conveying device (1) as claimed in claim 3, wherein each underlying layer (5, 50, 51) extends over at least a part over the length of said runner (20), preferably over the entire length of said runner.

20. The conveying device (1) as claimed claim 2, wherein each underlying layer (5, 50, 51) extends over at least a part of the width of said runner (20), preferably over a part less than the width of said runner (20).

\* \* \* \* \*